(12) United States Patent
Pfisterer

(10) Patent No.: US 8,413,284 B2
(45) Date of Patent: Apr. 9, 2013

(54) CARPET CLEANING MACHINE HAVING A DUAL STRIKER MECHANISM

(76) Inventor: Thomas Pfisterer, Freinsheim (DE)

( * ) Notice: Subject to any disclaimer, the term of this patent is extended or adjusted under 35 U.S.C. 154(b) by 34 days.

(21) Appl. No.: 13/118,425

(22) Filed: May 29, 2011

(65) Prior Publication Data

US 2011/0289704 A1    Dec. 1, 2011

(30) Foreign Application Priority Data

Jun. 1, 2010   (DE) .......................... 10 2010 022 446

(51) Int. Cl.
*A47L 11/36* (2006.01)

(52) U.S. Cl. ................ 15/94; 15/3; 15/89; 15/91; 15/92; 15/268

(58) Field of Classification Search ....................... 15/91; A47L 11/36; B08B 7/02
See application file for complete search history.

(56) References Cited

U.S. PATENT DOCUMENTS

2002/0078523 A1*  6/2002  Ball ................. 15/268

FOREIGN PATENT DOCUMENTS

| AT | 279528 | 11/1967 |
| DE | 95946 | * 10/1896 |
| DE | 231724 | 2/1910 |
| DE | 283702 | 8/1913 |
| DE | 673552 | 5/1935 |
| DE | 1904614 | 11/1964 |
| DE | 19932105 C2 | 7/1999 |
| DE | 10 2009 023 657.0 | 5/2009 |
| DE | 102009023657 | * 12/2010 |

* cited by examiner

*Primary Examiner* — Monica Carter
*Assistant Examiner* — Stephanie N Berry
(74) *Attorney, Agent, or Firm* — Smartpat PLC; Axel Nix

(57) ABSTRACT

A dual striker mechanism for a carpet-tapping machine comprises two striker grills which are mounted in a common body opposite one another so as to be pivotable about the longitudinal axis of their retaining rail. The tapping rods of the first striker grill thereby protrude into the gaps between the tapping rods of the second striker grill. The arrangement of the tapping rods of the two striker grills thereby forms a common horizontal plane.

The striker grills are coupled to one another such that upon a clockwise pivoting motion of the first striker grill, the opposite one moves counter-clockwise.

The drive motor for the striker grills generates an alternating pivoting motion about the longitudinal axis of the striker grills via an eccentric drive. The tapping rods of the two striker grills thereby move toward each other in their common substantially horizontal position. A clamping frame comprising resilient cables is arranged across the tapping rods of the striker grills which presses the positioned carpet at all times against the tapping rods of the upwardly-pivoted striker grill.

14 Claims, 5 Drawing Sheets

CARPET CLEANING MACHINE HAVING A DUAL STRIKER MECHANISM

TECHNICAL FIELD

The present disclosure generally relates to a device for cleaning carpets, and more particularly to a carpet cleaning machine for cleaning automobile floor mats comprising a dual striker tapping mechanism.

BACKGROUND

Carpet cleaning machines for automobile floor mats are known to be used and found on the premises of gas stations, car wash or repair shop facilities. A carpet-tapping machine is known from German patent application 10 2009 023 657.0, which is hereby incorporated by reference thereto in its entirety. The known carpet-tapping machine comprises a support grill to accommodate the carpet to be cleaned. The support grill consists of rods respectively mounted by the same end to a support grill retaining rail.

The rods are laterally positioned on the support grill retaining rail at a minimum distance from one another equal to double their rod width, respectively their rod diameter. The configuration of the support grill is comparable to a rack.

Parallel to the support grill retaining rail, a fixing rail is affixed to said support grill retaining rail so as to be movable and grips one side of the carpet to be cleaned, securing it to the support grill.

The cleaning process is effected by a motor-driven striker grill. The striker grill consists of tapping rods respectively mounted by the same end to a striker grill retaining rail. The configuration of the striker grill is likewise comparable to a rack. The length of the striker retaining rail thereby corresponds approximately to the length of the support grill retaining rail. The tapping rods are positioned on the striker grill retaining rail at a distance from one another which enables engaging in the gaps between the rods of the support grill without contacting said support grill. The two rack-shaped grills are arranged opposite one another. During the cleaning process, the carpet is held vertically, gripped on one upper side in the passive support grill, while the tapping rods of the active striker grill strike the dirty carpet surface in an alternating pivoting motion.

Achieving optimum and fast cleaning action requires a high impact rate as well as the tapping rods striking the entire carpet surface as fast as possible. With the known machine, however, the tapping rods cannot reach and strike the part of the carpet overlain by the fixing rail of the retaining grill.

Also disadvantageous is that the rods of the striker grill have to immediately move back in the opposite direction again after striking the carpet surface so that the part of the carpet held in the fixing rail will not be excessively kinked. The edge of the carpet at that point is under great mechanical stress.

A simple sinusoidal pivoting motion of the striker grill is incongruous with the need for the striker rods to strike the carpet surface at maximum speed and immediately move back again after striking the carpet surface.

SUMMARY

A carpet cleaning machine is presented, which eliminates the disadvantages of the known art and provides improved cleaning performance without increasing mechanical stress on the carpet. The machine is particularly suitable for cleaning smaller carpets, mats, and rugs such as for example automobile floor mats, door mats, and the like. The disclosed carpet cleaning machine comprises two striker grills, a first striker grill and a second striker grill, which are horizontally arranged opposite one another. The two striker grills are pivotally attached within the body of the carpet cleaning machine. The striker grills assume a horizontal idle position when the machine is not operating. The horizontal idle position of the striker grills provides a support surface onto which a dirty carpet can be placed. A separate, dedicated, support grill, as known from the prior art, is not required. Instead, the striker grills of the disclosed machine serve a dual purpose of providing the horizontal support surface for the carpet to be cleaned when the machine is in idle state, and then both actively participate in the cleaning process when the machine is operating. The two striker grills form a dual striker mechanism.

Each striker grill comprises a plurality of rod-shaped tapping rods which extend from a retaining rail. One end of each tapping rod is firmly attached to the retaining rail. The tapping rods are arranged parallel to each another, and are spaced from one another so that the gap between two adjacent tapping rods is larger than the width of a tapping rod. In case of cylindrically shaped tapping rods the width of a tapping rod equals its cross-section. The tapping rods are attached preferably perpendicular to the retaining rail. The striker grills are comparable to a rack. The retaining rails of the first and the second striker grill are pivotably mounted to the ends of their longitudinal axes.

The first striker grill and the second striker grill are mounted opposite each other to a machine body. The striker grills are positioned so that the tapping rods of the first striker grill protrude the gaps between tapping rods of the second striker grill, and vice versa tapping rods of the second striker grill engage gaps between tapping rods of the first striker grill. The striker grills are rotatably supported about the longitudinal axes of their retaining rails. The tapping rods of the first striker grill thereby protrude into the gaps between the tapping rods of the second striker grill. The distance between the retaining rails of the first and the second striker grill is larger than the tapping rod length of the striker grills, but less than twice their length. Preferably, the distance between the retaining rails equals between 1.05 and 1.35 times the length of the tapping rods. While the machine is in idle state the tapping rods of the two striker grills jointly form an approximately horizontal plane.

The striker grills are operatively connected to an actuating mechanism which causes the striker grills to pivot about their retaining rails. The tapping rods of each striker grill swivel up and down between approximately 5 and 25 degrees from their horizontal idle position. An upward and downward deflection of the striker grills by ±16 degrees has proven to be particularly beneficial. The retaining rails of the first and second striker grill are counter-rotating, so that the tapping rods of the first striker grill are moving in opposite direction to the tapping rods of the second striker grill. The striker grills are interconnected such, that upon a clockwise pivoting motion of the first striker grill, the second striker grill moves counter-clockwise.

The actuating mechanism for the striker grills alternatingly pivots the striker grills at predetermined pivoting angles about the longitudinal axis' of their retaining rails. In so doing, the tapping rods of the two opposite striker grills vertically affixed to the retaining rail move toward each other in alternating manner. While the tapping rods of one striker grill are moving upward, the tapping rods of the opposite striker grill are moving downward. In the idle state, the striker grills are substantially situated in a common horizontal position. This idle position of the striker grills forms the support surface for the carpet to be cleaned.

The striker grills, and more particularly the ends of their retaining rails, are pivotably mounted to the machine body. The attachment of the retaining rails at the body is at a height, which allows a user to comfortably place a carpet onto the striker grills.

During operation, the carpet is held onto the striker grills by a retaining member. The retaining member may comprise resilient cables or belts. The resilient cables are oriented approximately perpendicular to the striker rods and attached to a clamping frame. The resilient cables are extendable within the clamping frame, so that they can extend while holding the carpet onto the striker grill when moving upward, and contract, while the striker grill is moving downward. The resilient cables may be elastic, e.g. made of synthetic rubber. The resilient cables may also be inelastic, but mounted to the clamping frame by springs which provide the necessary extension and contraction. The resilient cables are tensioned in the clamping frame to yield a reticulated surface. This reticulated surface roughly corresponds to that of the carpet to be cleaned. The clamping frame is connected to the machine body such that it presses the carpet lying on the striker grills against said striker grills by means of the resilient cables. The clamping frame and resilient cables positioned thereon are thereby arranged so as to allow the pivoting motion of the striker grills. During the cleaning process, the carpet is continuously pressed against the striker grill pivoting upward toward the clamping frame. The clamping frame is pivotably connected to the machine body so that it can swivel up and out, allowing the carpet to be placed onto the striker grills.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
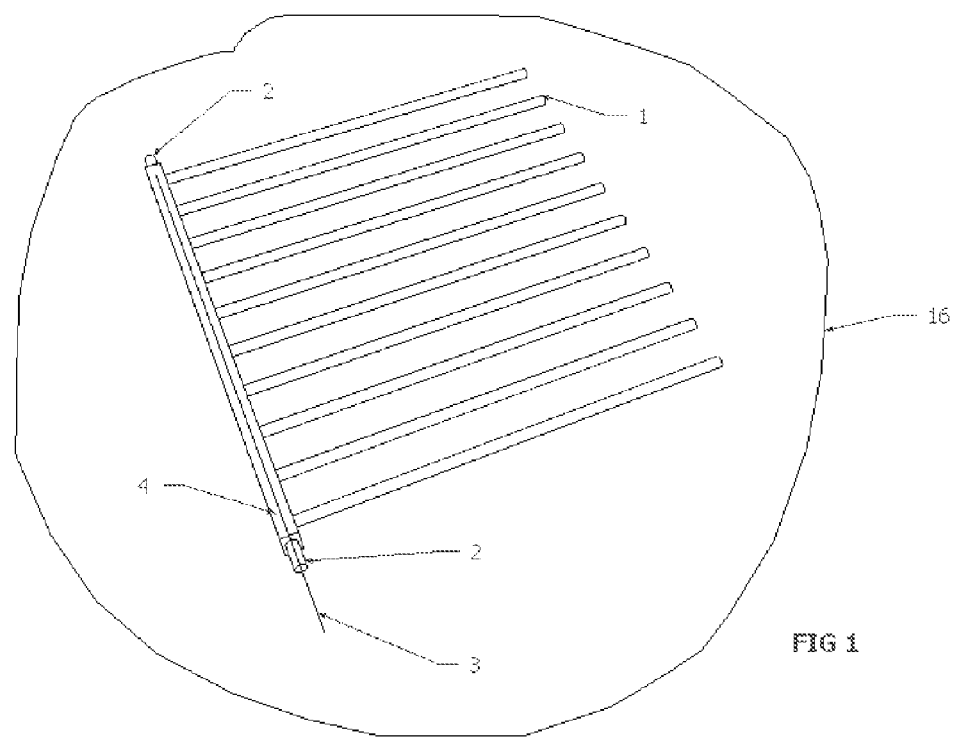
FIG. 1 shows a striker grill comprising tapping rods.

Referring to FIG. 1, a striker grill 16 for use in a dual striker mechanism for a carpet cleaning machine comprises a plurality of tapping rods 1, which are connected to a retaining rail 4. Both ends of retaining rail 4 extend into a hinge section 2, which allows striker grill to pivot about longitudinal axis 3 when mounted to the body of a carpet cleaning machine (not shown in FIG. 1).

Figure 2:
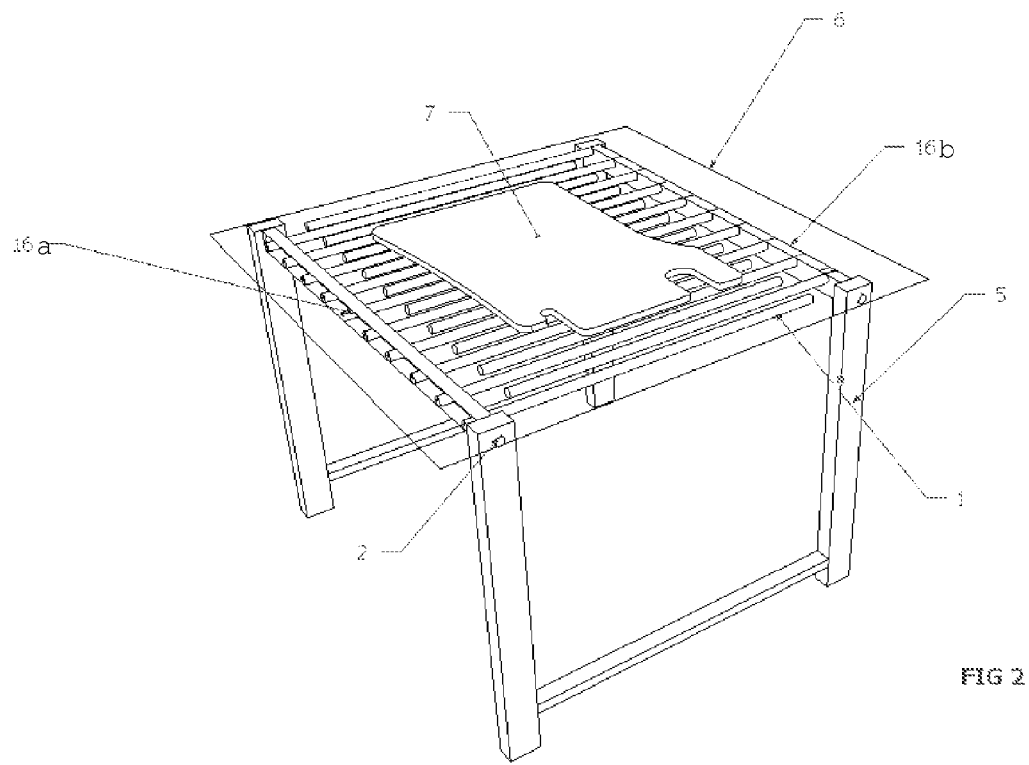
FIG. 2 illustrates a cleaning machine comprising two striker grills in the idle state.

FIG. 2 shows an exemplary dual striker mechanism within a body 5 of a carpet cleaning machine in idle state. A first striker grill 16a is mounted opposite a second striker grill 16b. Tapping rods 1 of the first striker grill 16a are offset from those of the second striker grill 16b. The offset is selected such that the tapping rods 1 of one striker grill engage in the gaps of the opposite striker grill. Hinge sections 2 of both striker grills 16a and 16b are pivotally attached to body 5 of the carpet cleaning machine. Striker grills 16a, 16b are shown FIG. 2 in an idle position, in which the first striker grill 16a and the second striker grill 16b are located in a common horizontal plane 6. A spoiled carpet 7 can easily be placed onto the horizontal support surface created by striker grills 16a and 16b.

Figure 3:
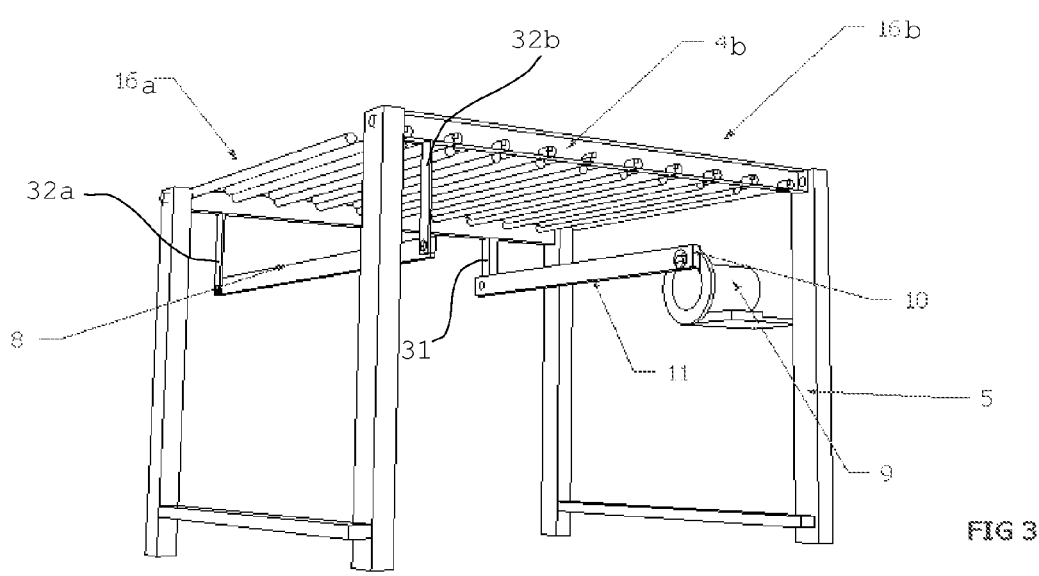
FIG. 3 illustrates an actuating mechanism for a dual striker mechanism in a carpet cleaning machine.

Referring now to FIG. 3, an actuating mechanism for a dual striker mechanism for cleaning carpets is shown. The actuating mechanism comprises a drive motor 9, which is preferably an electric motor but may be any other source of rotational power. Drive motor 9 is connected to an eccentric wheel 10. A first connecting rod 11 extends between eccentric wheel 10 and drive lever 31. Drive lever 31 is securely attached to retaining rail 4a of the first striker grill 16a. Rotation of eccentric wheel 10 at drive motor 9 is translated by into a swiveling action of the first striker grill 16a. One full rotation of the motor causes 9 causes striker grill 16 to move once between its fully upwards deflected position and its fully downward deflected position. The effective length of drive lever 31 and eccentric wheel 10 are selected to cause an upward and downward deflection of first striker grill 16a by approximately ±5 to ±25 degrees, preferably by ±16 degrees.

The first striker grill 16a is connected to the second striker grill 16b by a coupling rod. One end of coupling rod 8 is pivotally connected to a first coupling lever 32a at retaining rail 4a of the first striker grill 16a. The opposite end of coupling rod 8 is pivotally connected to a second coupling lever 32b at retaining rail 4b of the second striker grill 16b. By this arrangement pivoting motion of the first striker grill 16a effects a pivoting motion of the second striker grill 16b in the opposite direction. Preferably, the first coupling lever 32a and the second coupling lever 32b are of the same length, thereby causing equal but opposing deflection of the opposing striker grills 16a and 16b.

Figure 4:
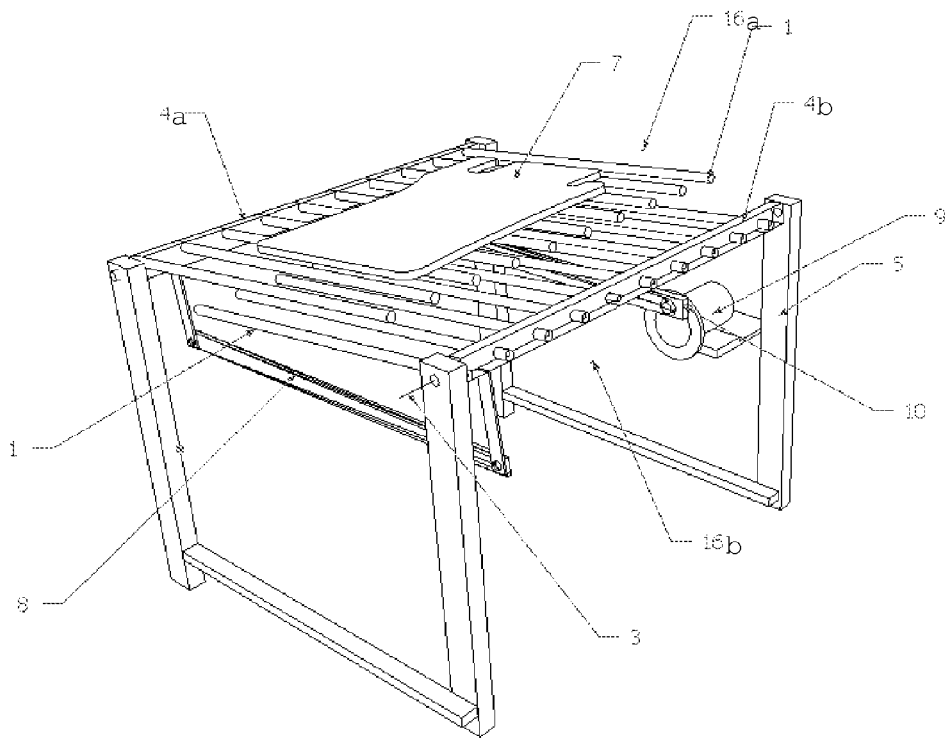
FIG. 4 shows the dual striker mechanism of a carpet cleaning machine in a deflected state during operation.

Referring now to FIG. 4, the dual striker mechanism is shown during operation. As shown, the first striker grill 16a is in an upward deflected state while second striker grill 16b is in a downward deflected state. Spoiled carpet 7 rests entirely on the tapping rods 1 of the first striker grill 16a. Through further rotation of motor 9 first striker grill 16a will eventually move downward and spoiled carpet 7 will be struck by the upward moving tapping rods of the second striker grill 16b. Consecutive tapping of carpet 7 by upward moving tapping rods causes dirt and debris to come loose and fall down, thereby cleaning carpet 7.

Figure 5:
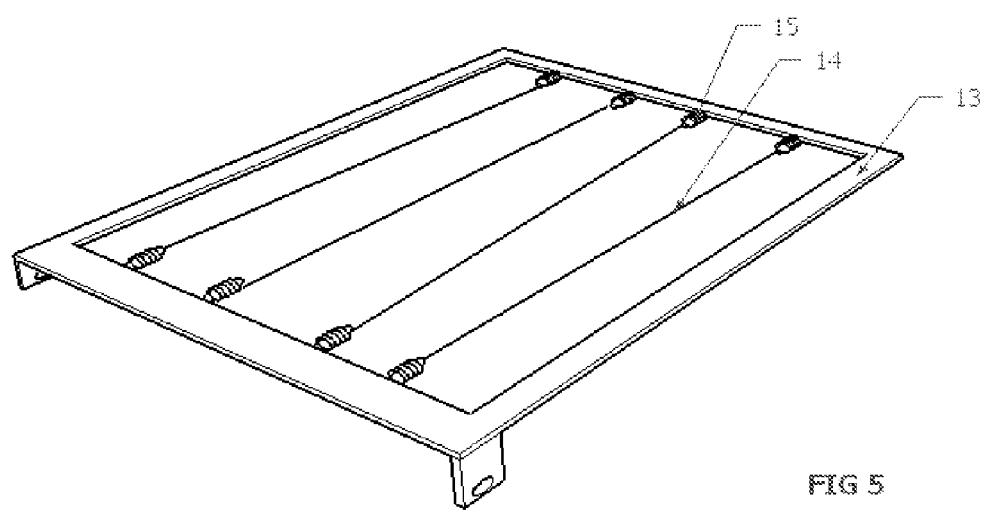
FIG. 5 shows a clamping frame comprising resilient cables for use in a carpet cleaning machine.

To prevent carpet 7 from excessively moving around within a carpet cleaning machine a retaining member as illustrated in FIG. 5 may be used. A clamping frame 13 comprises resilient cables 14. The elastic resiliency is created by connecting the cables 14 to the clamping frame 13 via springs 15.

Figure 6:
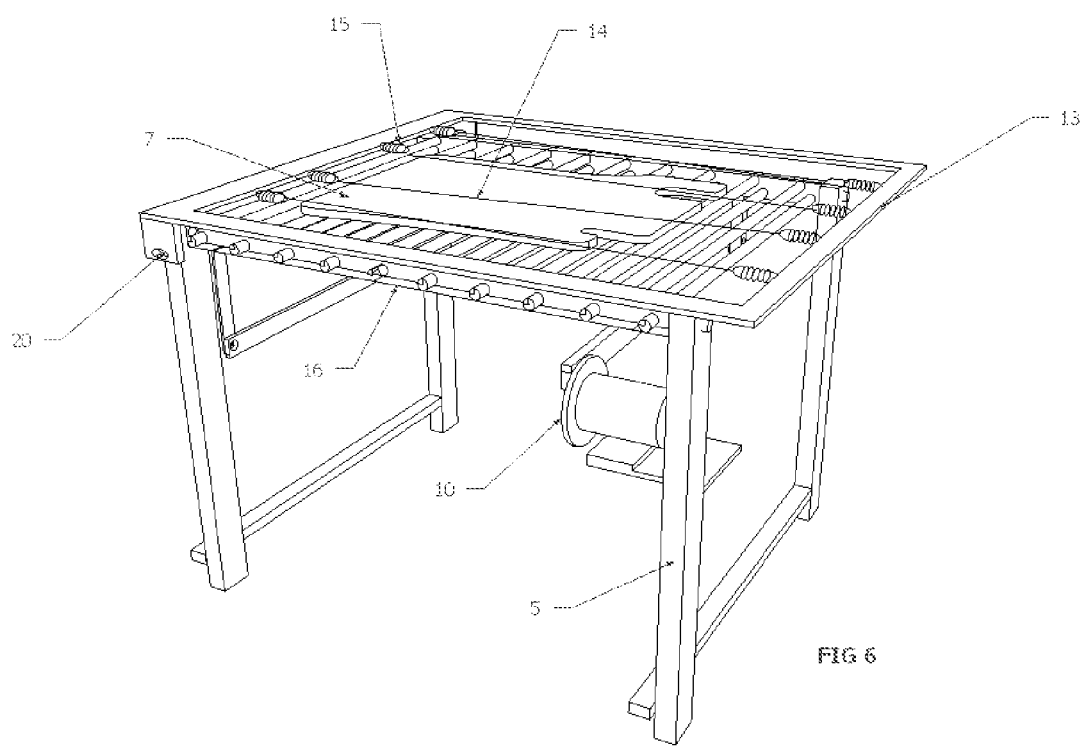
FIG. 6 shows the clamping frame as in FIG. 5 within a carpet cleaning machine.

As shown in FIG. 6, one side of the clamping frame 13 is mounted to body 5 of the carpet cleaning machine via a hinge 20 so as to be pivotable. The cables 14 run transversely to the tapping rods 1 across the rear side of the carpet 7.

Figure 7:
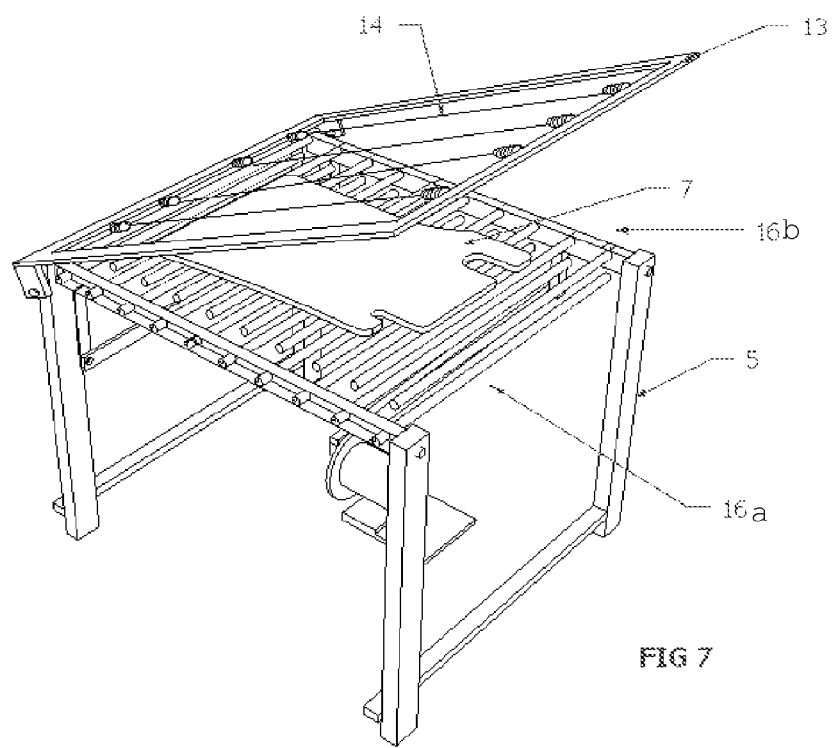
FIG. 7 shows a dual striker carpet cleaning machine in idle state, ready to load or unload a carpet to be cleaned.

Clamping frame 13 can rotate upward to provide access for placing a carpet 7 onto the dual striker mechanism or removing a carpet 7 there from. FIG. 7 shows the upward-opened clamping frame 13. The dual striker mechanism is in a position of rest with the carpet 7 positioned thereupon.

Figure 8:
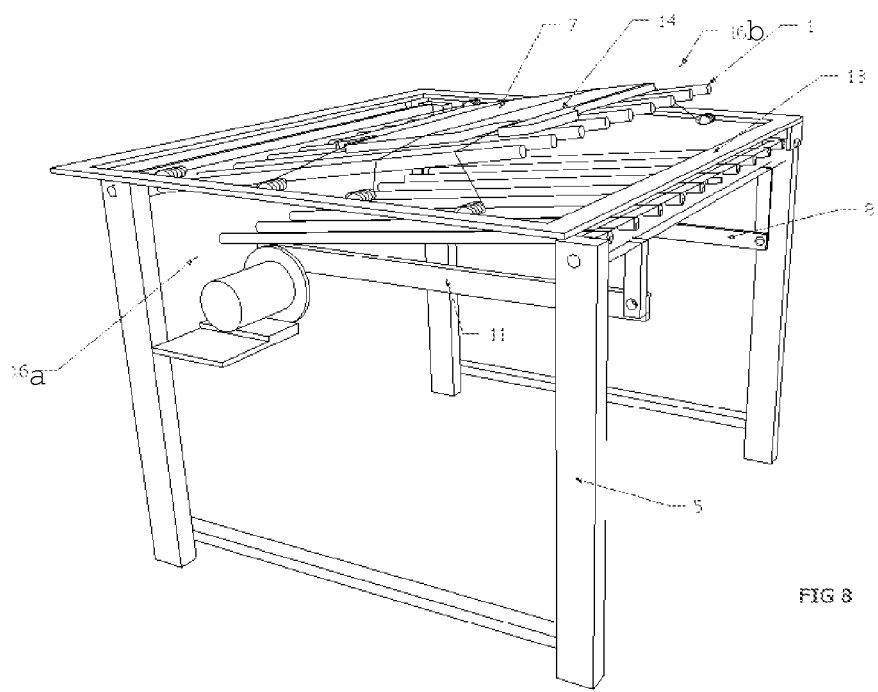
FIG. 8 shows the carpet cleaning machine as in FIG. 7 during operation.

Referring now to FIG. 8, a carpet cleaning machine is shown during operation with pivoted striker grills 16. The respective upwardly-deflected tapping rods 1 lift the carpet 7 upward. The elastically arranged cables 14 at the rear side of the carpet 7 ensure that carpet 7 is continuous pressed against tapping rods 1, thereby preventing undesirable movement of carpet 7 on the striker grills.

Figure 9:
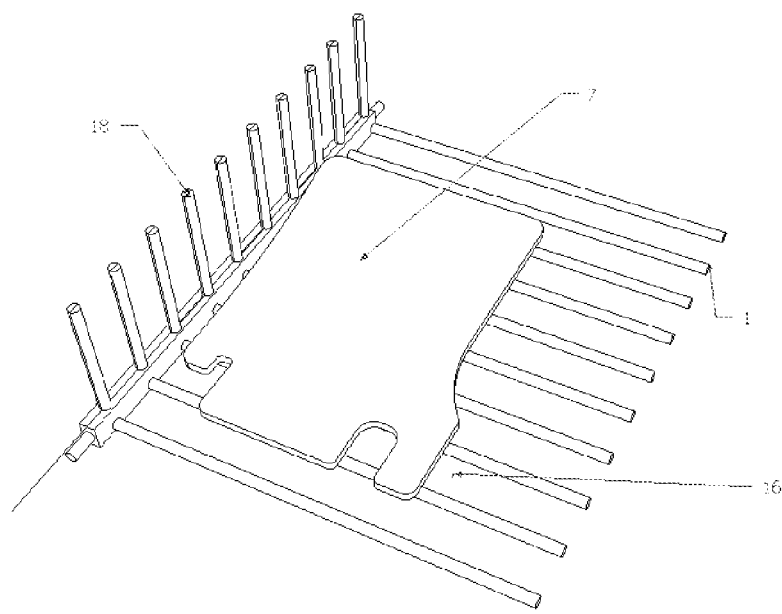
FIG. 9 illustrates a striker grill comprising side deflector elements.

As illustrated in FIG. 9 striker grill 16 may comprise deflector elements 18 which prevent the lateral shifting of the positioned carpet 7.

Figure 10:
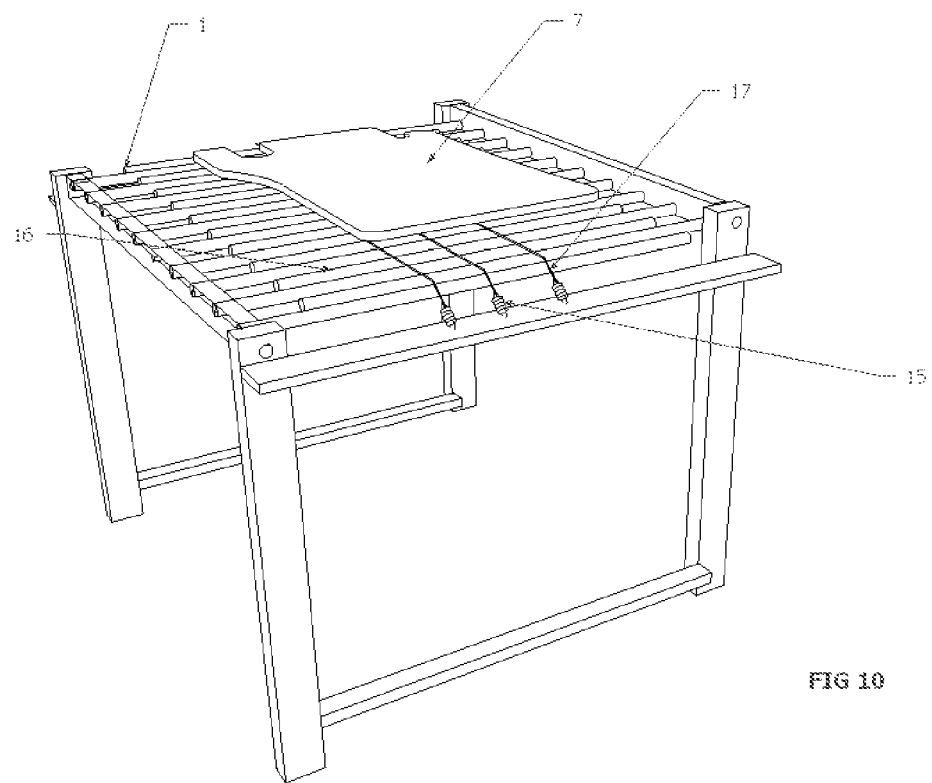
FIG. 10 illustrates a dual striker carpet cleaning machine utilizing an alternative resilient cable attachment.

Referring now to FIG. 10, support cables 17 are tensioned between the carpet 7 and the striker grills 16 essentially crosswise to the tapping rods 1 of the striker grills 16. The support cables 17 are tensioned by means of springs 15 and thus yield to the movements of the striker grill 16.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A carpet cleaning machine, comprising:
   a first striker grill pivotally connected to a body of the carpet cleaning machine, the first striker grill comprising a first retaining rail and a first plurality of tapping rods extending from the first retaining rail;
   a second striker grill comprising a second retaining rail and a second plurality of tapping rods extending from the second retaining rail, the second striker grill being pivotally connected to the body of the carpet cleaning machine opposite the first striker grill such that the tapping rods of the first striker grill engage in gaps between the tapping rods of the second striker grill;
   an actuating mechanism, operatively connected to the first striker grill and to the second striker grill, the actuating mechanism being configured to effect an alternating upward and downward deflection of the first striker grill about a longitudinal axis of the first retaining rail and a deflection of the second striker grill about a longitudinal axis of the second retaining rail in opposite direction; and
   a retaining member configured to hold a carpet against the tapping rods of the striker grills,
   wherein the first striker grill and the second striker grill assume a substantially horizontal idle position when the machine is not in use.

2. The machine as in claim 1, wherein the actuating mechanism comprises:
   a drive motor;
   an eccentric wheel connected to the drive motor;
   a connecting rod operatively connected at one end to the eccentric wheel and to the first striker grill at its opposite end; and
   a coupling rod operatively connected on one end to the first striker grill and operatively connected on an opposite end to the second striker grill.

3. The machine as in claim 1, further comprising a clamping frame to which the retaining member is attached.

4. The machine as in claim 3, wherein the retaining member comprises a plurality of cables or belts which are attached to the clamping frame by springs.

5. The machine as in claim 1, wherein the retaining member comprises a plurality of elastic cables or belts.

6. The machine as in claim 3, wherein the clamping frame is pivotally attached to the body of the carpet cleaning machine.

7. The machine as in claim 1, wherein at least one striker grill serves as a support surface onto which a carpet can be placed for cleaning.

8. The machine as in claim 1, characterized in that the first striker grill and the second striker grill form a support surface for placing a carpet thereon while the machine is idle.

9. The machine as in claim 1, wherein resilient retaining cables extend substantially crosswise to the tapping rods, being arranged between the tapping rods and the carpet.

10. The machine as in claim 1, wherein the tapping rods are mounted perpendicular to their retaining rail.

11. The machine as in claim 1, wherein the tapping rods are mounted at an angle other than perpendicular to their retaining rail.

12. The machine as in claim 1, further comprising deflector elements—extending upwardly from the retaining rail of the first striker grill and from the retaining rail of the second striker grill.

13. The machine as in claim 1, further comprising a deflector rail.

14. The machine as in claim 1, wherein during operation the first striker grill and the second striker grill are deflected between ±5 degrees and ±25 degrees from their horizontal idle position.

* * * * *